Oct. 29, 1929. H. A. BORRESEN 1,733,109
GYROSCOPICALLY STABILIZED INCLINOMETER
Original Filed Oct. 28, 1918 3 Sheets—Sheet 1
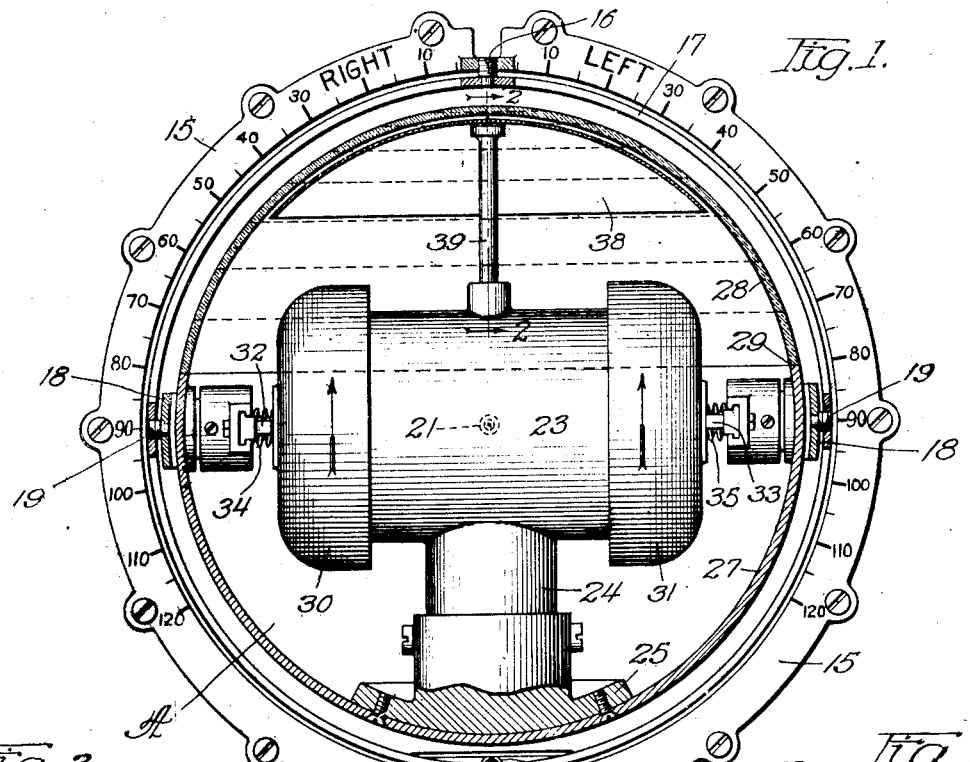

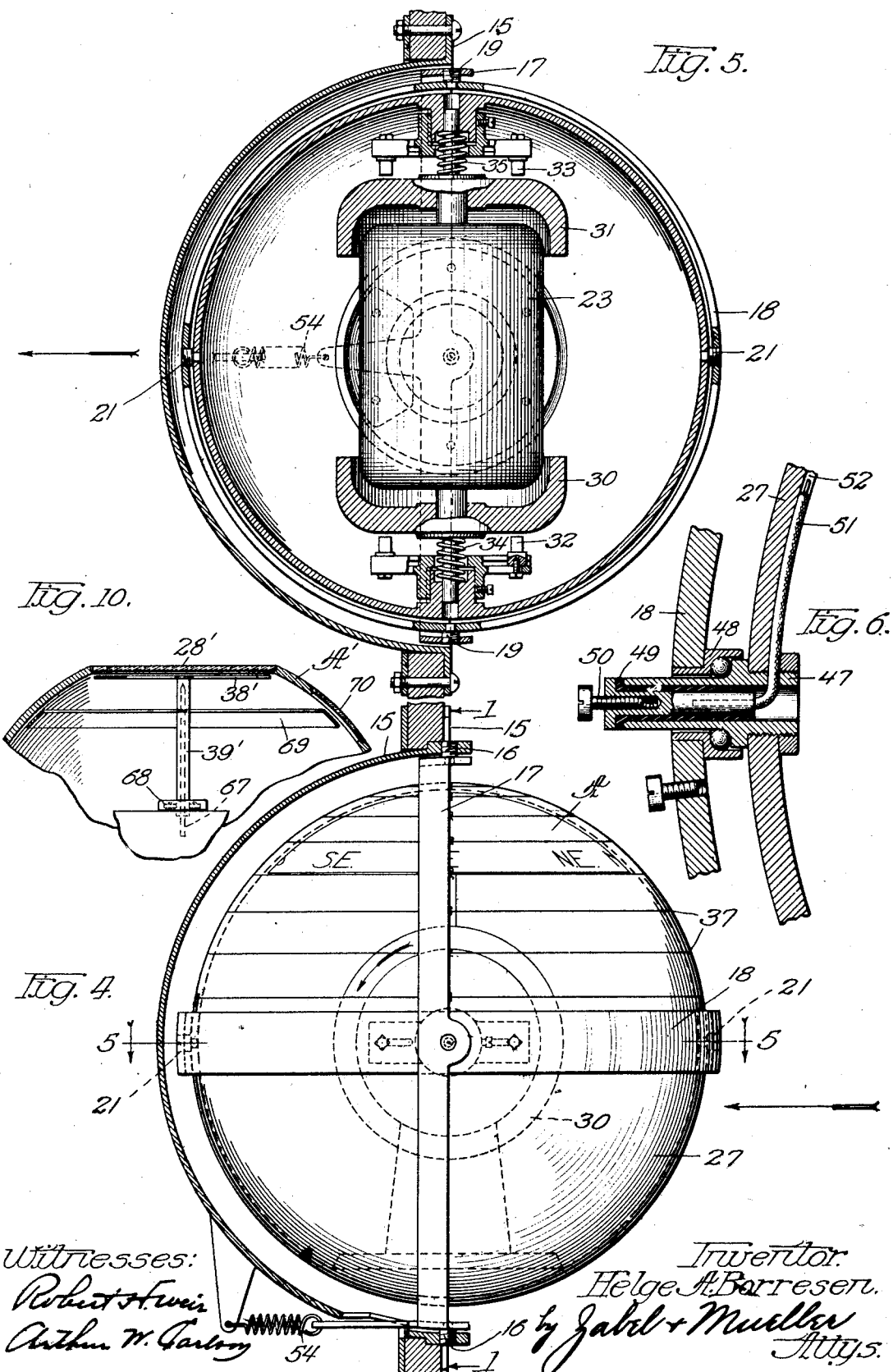

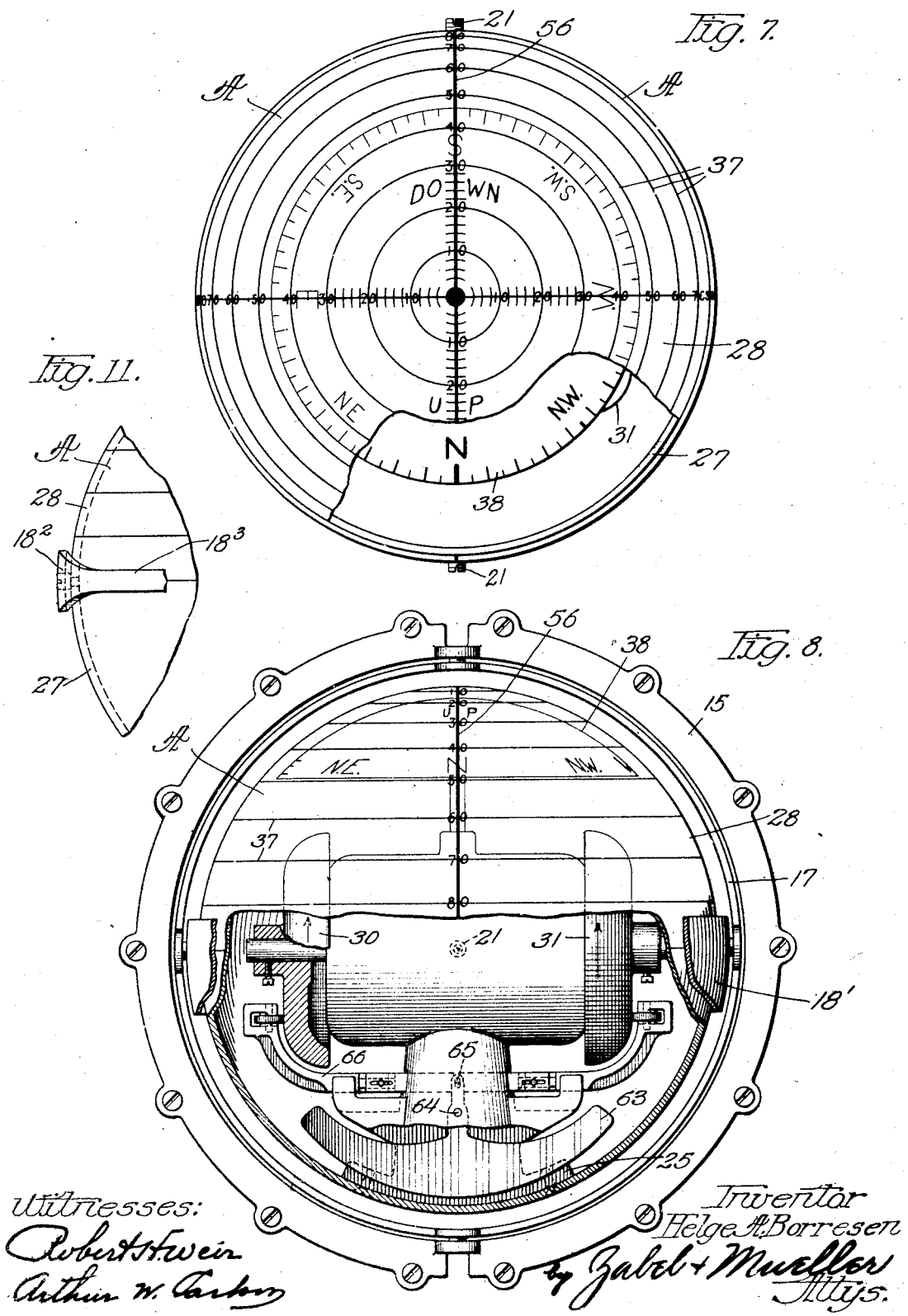

Patented Oct. 29, 1929

1,733,109

UNITED STATES PATENT OFFICE

HELGE A. BORRESEN, OF CHICAGO, ILLINOIS

GYROSCOPICALLY-STABILIZED INCLINOMETER

Application filed October 28, 1918, Serial No. 259,910. Renewed March 13, 1928.

My invention relates to indicating instruments and has to do more particularly with devices of this character adapted for indicating the inclination to the horizontal of a traveling object such as an aeroplane, submarine-boat, etc., it being also adapted for use in supporting and stabilizing compasses. My invention is particularly useful in connection with aeroplanes for indicating the angle of inclination to the horizontal, showing for example, whether the aeroplane is traveling to the right, left, upwardly or downwardly, or in any resultant direction. To this end I provide an indicating device adapted to remain in a substantially level position regardless of the direction of travel of the aeroplane, preferably using a device supported by a so called gimbal bearing or universal joint which in the preferred embodiment includes two sets of bearings in one plane and a third bearing vertical thereto. In order to maintain the device substantially level I provide a motor driven gyroscopic element which I preferably mount within the inner ring or support and with its axis of rotation in a horizontal plane and transverse to the direction of travel.

For a better understanding of my invention reference is to be had to the accompanying drawings in which Fig. 1 is a face view of the instrument but in section along line 1, 1 of Fig. 4;

Fig. 2 is a sectional view along the line 2, 2 of Fig. 1 showing a jewel bearing support for the compass needle and magnetic disc;

Fig. 3 is a section along the line 3, 3 of Fig. 2 showing the jewel roller bearing for the compass shaft;

Fig. 4 is a side view of the indicator with its outer protection in section and mounted in the cowl;

Fig. 5 is a transverse section along the line 5, 5 of Fig. 4;

Fig. 6 is a detailed view of an insulated bearing through which the connection to the gyroscope motor may extend;

Fig. 7 is a plan view of the top of the globe or stationary element of the indicator, showing the graduations marked thereon and the graduations marked on the magnetic disc of the compass inside the globe;

Fig. 8 is a modified arrangement for supporting the gyroscope for automatic adjustment thereof;

Fig. 9 is a modification showing the indicator combined with a magnetic needle and degree reading disc;

Fig. 10 is a section along the line 10, 10 of Fig. 9 showing a method of supporting the compass needle and degree disc; and Fig. 11 is a detailed view showing that the rings may be narrowed down so as to reduce weight and obscure less of the instrument.

Referring now to the preferred form of my invention as shown in Figs. 1 to 7, it includes an outer support or mounting in the form of a graduated ring 15 adapted for attaching the instrument to the cowl or instrument board on the aeroplane, or whatever it may be used with, although, of course, it is to be understood that other mountings may be used depending upon how the instrument is to be attached. Supported in the vertical axis 16, 16 in the ring or frame 15 is a movable support in the form of an outer ring 17 which in turn carries an intermediate ring 18 upon a horizontal axis 19, 19 and supported within this intermediate ring 18 is an inner gyroscopic support preferably in the form of a globe A pivoted upon the axis 21, 21 in the same plane as the axis 19, 19. Thus the inner and intermediate rings or supports are preferably supported upon axes in the same plane and the intermediate ring in turn is supported upon an axis perpendicular thereto.

From the general explanation so far given it will be apparent that the inner gyroscopic support A is universally mounted so that it may be maintained in a definite position regardless of any position the support 15 may take.

Now in order that the inner element A, which it might be said acts as the stationary element or indicator for the instrument, may be held stationary and uninfluenced by the inclination of the support 15, I provide a gyroscopic element 23 preferably in the form of an electrically driven device rigidly attached to the stationary indicator A preferably by an adjustable mounting 24 and base 25, which in the form of my invention shown in Figs. 1 to 7, acts to assist in maintaining the member A in a normal position when the device is acting, and also assures the maintenance of the indicating member A in its normal position when the gyroscope is at rest and the aeroplane stationary so that in starting, the indicator is in proper position.

So far I have simply described in general the arrangement and disposition of the parts. Now as to the detailed construction, the inner support or stationary indicating element A is preferably in the form of an overweighted or unbalanced hollow spherical framework consisting of a metallic base 27 and transparent top, preferably in the form of a glass section 28 suitably secured to the base 27 at the line 29. Supported by the base 27 is a motor 23 which is carried by the adjustable standard comprising parts 24 and 25, the base 25, which in this form of my invention acts to unbalance the globe, being securely fastened to the portion 27 in a suitable manner. It is to be understood, however, that the motor and gyroscope may be lowered on a light standard 24, 25 so that they act as the weight to unbalance the globe A instead of depending upon the extra weight of the standard thus lightening the device and also placing the motor farther away from the compass needle. The gyroscopic element 23 is electrically driven and may consist of a suitable motor carrying fly wheels 30, 31 attached upon opposite ends of the motor shaft, these fly wheels being preferably cupped so as to extend over the ends of the motor frame thereby securing weight and at the same time a more compact device. The motor shaft preferably has some longitudinal play, this being for the purpose of providing a brake action effective at certain times as will be hereinafter more fully explained. This brake mechanism, as shown more clearly in Fig. 5, consists of suitable adjustable stationary brake shoes 32, 33 which are adapted to engage the outer faces of the fly wheels 30, 31 when the action of the aeroplane is such as to throw the motor shaft to one side or the other by centrifugal force as when the aeroplane is turning toward the right or left. It will be noted that a pair of springs 34, 35 are provided which maintain the motor normally in an intermediate position. If the advance of the aeroplane is such as to throw the shaft toward the right as for example, when the aeroplane is traveling to the left, the brake shoe acts upon the fly wheel 31 to retard the rotation of the motor and decrease its speed. This action is for the purpose of reducing the gyroscopic effect under certain conditions as will be hereinafter more fully pointed out. To the contrary, when the motor shaft is forced in the opposite direction, the brake shoe 32 acts upon the fly wheel 30 and retards the rotation of the motor thus decreasing its speed and likewise its gyroscopic effect. It will be noted that the brake shoes 32, 33 are adjustable so that they may be moved not only toward and away from the fly wheels but the contact points are also radially adjustable upon their supporting arms so as to secure the proper cooperation between the parts.

Referring now to the transparent or upper part 28 of the globe A, this is graduated at the lines 37 preferably to indicate degrees of inclination to horizontal, these graduation lines being shown more clearly in Figs. 4 and 7. This indicating part of the globe A may also be marked in other suitable ways, as "Up" and "Down" so that the aviator may know at a glance the direction of travel and the degree of inclination. The blackened spot on the top of the globe A also assists in more readily determining the general inclination.

Now in addition to the angle indicator I may also provide a compass which consists of a magnetic disc element in the form of a spherical disc 38 which is suitably magnetized so as to act as a compass disc and rotatably supported preferably in a manner as more clearly shown in Figs. 2 and 3. This supporting means consists preferably of a tube 39 which may be threaded into the motor frame and carries a shaft or spindle 40 preferably of non-magnetic material suitably attached to the disc element 38 at the top and carrying a hardened steel point 41 supported in an oil containing jewel bearing consisting of a base jewel 42 and hollow jewel bearing 43 which is cupped out to act as an oil retainer. It is also to be noted that the extremity of the shaft 41 is rounded so as to have only a slight point of contact, the end and side bearings being so proportioned that the frictional retardation upon the needle spindle 40 is the same regardless of the position of the compass. That is the frictional retardation is the same whether the spindle 40 is in a vertical or in an inclined position. At the magnetic disc end of the spindle 40 I provide a jewel roller bearing consisting of a plurality of jewel rollers 44 carried by the shafts 45 and disposed around the spindle 40. By the provision of this bearing I reduce the friction to a minimum because the spindle 40 is resting against the peripheral edge of the jewels 44 which rotate upon the comparatively small shafts 45. A dust cup 72 is provided for enclosing and protecting this bearing.

It will thus be apparent that I have provided a compass bearing which rotates practically without friction and in which the frictional resistance is practically constant. The magnetic disc 38 or needle by locating the two bearings 60 and 61 remotely apart is caused to rotate in a definite plane and therefore in consistent and contiguous relation to the reading registers effecting accurate reading. The point 62 prevents shaft 40 from dislodgment in bearing A by the proximity of glass 28.

Now as to the intermediate support for the device, as already stated this includes the ring 18 which supports the inner element A in bearings 21 in a plane preferably horizontal and parallel to the axis of the gyroscope. This ring 18 supports the element A preferably by means of an insulated ball bearing as shown in Fig. 6, this being provided for the purpose of having a conductive path through the bearings to the gyroscope motor. This bearing as shown in Fig. 6 comprises a sleeve 47 passing through the shell 27 and having a ball race co-operating with the ball race 48 carried by the ring 18. An insulating sleeve 49 is inserted between the binding post 50 and the sleeve 47 so that current may be conducted from the binding post 50 to a conductor 51 adapted to lie in the slot 52 on the inner surface of the shell 27. By this construction it will be seen that an insulated ball bearing joint is provided, one which although providing a conductive path therethrough is insulated from the rest of the device. It is to be understood that bearings of this type are to be used at the requisite bearings so as to provide an insulated conductive path from the interior of the device to the gyroscope motor. The return path is through the frame. At the various pivotal bearings in the rings I have merely shown a small threaded stud but it is to be understood that this is merely for diagrammatic purposes and that suitable ball bearings, some of which are insulated are to be provided so as to have an easily operable device.

The outer support 17, which carries the intermediate ring 18 is also preferably a ring supporting the intermediate ring 18 at the bearings 19, 19 preferably in alignment with the bearings 21, 21 and the motor axis, so that we have these three axes positioned preferably parallel to each other and which in the preferred form of my instrument are normally horizontal planes. One of the bearings 19 is an electrical ball bearing connection while the opposite bearing may be a cone bearing and this system is provided at the various gimbal bearings for purposes of adjustment and assembling.

This ring 17 which normally lies in a vertical plane also co-operates with the indicator globe A to indicate the inclination of the aeroplane to the horizontal, the front edge of the ring 17 being in line with the axis of the bearings 19, 19 and co-operating with the graduations 37 on the upper part of the indicator A to show the inclination to the horizontal. Thus it will be apparent, that with the aeroplane moving forwardly as indicated by the arrows in Figs. 4 and 5, should the machine be driven upwardly the indicator A will remain comparatively stationary but the upper half of the ring 17 would move toward the front of A, in the direction marked "Up" on the globe as shown in Fig. 7, the front edge of the ring 17 indicating the exact angle of inclination by the degrees marked upon the globe A. Should the aeroplane be driven downwardly the front edge of the ring 17 would move toward the rear of the indicator A likewise showing the degrees of downward inclination.

This outer ring 17 which it will be noted is also pivotally supported, is carried by the frame 15 and rotatably mounted in the bearings 16, 16. Thus it will be seen that the axis of rotation for the outer ring 17 is perpendicular to the other two axes of rotation of the universal joint but the rotary movement of this outer ring 17 is a limited one, being determined by the yielding connection 54 which permits but a slight movement of the ring 17 so that during certain maneuvers of the aeroplane, as for example abrupt side turns, there is no sudden jar to the controlling mechanism as this yielding connection 54 acts as a sort of a buffer to prevent undue shock displacement of the gyroscope.

*Operation of Figs. 1 to 7*

Having described the construction of my invention as shown in Figs. 1 to 7 I will now take up its operation. Assuming the device is constructed for use in an aeroplane, it is mounted in the cowl or instrument board with the device facing the operator as shown in Fig. 1. In starting out, the instrument is in the position indicated due to the overweighting or unbalancing of the parts, as appears from Fig. 1. The motor of the gyroscope is then started, the fly wheels rotating in the direction indicated by the arrows in Fig. 8, that is, so that the top of the fly wheels are moving away from the operator. The gyroscopic effect is, of course, thus brought about. As the plane moves forward in a horizontal position the indicator of course remains relatively stationary but assuming that the operator, after attaining some height, inclines the aeroplane upwardly at quite an angle the unbalanced effect of the inner globe tends to maintain the globe A in practically a constant level position. Therefore the indicating edge of the ring 17 moves around toward the front of the globe A due to the pivotal bearings 19, 19 and the operator can by noting the reading on the graduations 37 of the upper part of the indicator A, tell at a glance that he is traveling upwardly and also the degree of inclination. Now assuming that while the operator is traveling upwardly he points his machine toward the right, the gyroscopic action will then counteract the centrifugal disturbance imparted to the unbalanced globe. In this case the indicator A will follow the aeroplane, remaining stationary relative thereto except for such slight momentary lag permitted by the yielding connection 54 at the bottom of the ring 17. That is, should the operator point his machine very suddenly toward the right the gyroscope may tend to prevent an immediate following by the globe A, and if the globe A were held rigid the sudden shock might affect the mechanism. But by providing the yielding connection 54 it acts as a sort of a buffer and although there may be a slight lag in the follow up movement of the indicator A during the turning movement of the aeroplane, the spring will very quickly draw it back into position.

Assuming now that the machine continues its advance at the same upward inclination but starts to turn bodily as in the direction of a right handed screw-thread. Immediately the gyroscopic effect is such that the indicator globe A remains practically level, turning upon the pivots 21, 21 in the ring 18 as the plane rotates. This movement is therefore immediately indicated by the graduations upon the indicator frame 15, the heavy line 56 upon the globe A moving along the frame 15 toward the left and indicating to the operator that he is rotating bodily toward the right, the device also indicating the angle of inclination as already described. If the operator makes a complete half turn so that he is moving forwardly up-side-down, it will be apparent that the line 56 would be at the bottom of the ring 15. It will thus be apparent that the operator can tell at a glance the exact direction of travel by noting the position of the indicating edge of the ring 17 on the graduations 37, and noting the position of the line 56 on the globe A relative to the graduations on the outer frame or ring 15.

Now in addition to the fact that the device indicates the angles of inclination, the compass will show the general direction of travel by means of the magnetic disc 38 always maintaining a north and south position. Thus the operator can tell by the relative positions of the so-called lubber-line 56 and graduations upon the magnetic disc 38, the general direction of travel.

In the above description of operation I refer to certain directions of travel and it, of course, will be apparent that in traveling in directions opposite to those described the indicator will work just oppositely.

Now in connection with the general operation and arrangement of my invention as shown in Figs. 1 to 7 I have found that by having the axis of the gyroscope in a horizontal plane and transverse to the direction of travel, a control of the device is secured different than when the axis lies in a vertical plane. That is, with a transverse horizontal axis, the gyroscopic effect is the same whether the aeroplane turns to the right or to the left. I have found that with the gyroscope traveling in the direction of the arrows indicated thereon, that is, what might be said "with the machine," there is a tendency to oppose the centrifugal force acting to throw the unbalanced or overweighted part of the indicating globe A outwardly when the machine is taking a right or left turn. The gyroscopic effect neutralizes the centrifugal force. That is, assuming the aeroplane is moving forward on a right turn, without the gyroscope and with only the overweighted or unbalanced globe, the overweighted part of the globe would swing outwardly at the bottom on the pivots 21, 21. By having the gyroscope rotate "with the machine" as indicated by the arrows, this centrifugal force is neutralized by a properly proportioned gyroscopic action. By operating the gyroscope "with the machine" it is a question of properly proportioning the weight and angular velocity of the gyroscope and degree of unbalance, to produce a neutralizing effect upon the centrifugal force sufficient to maintain the indicating globe A in a practically level position. Now this centrifugal force, of course, also varies with a variation in the angular velocity of the machine in making a turn as to the right or left and in order to accommodate for this variation, I provide the brake mechanism 32, 33 which acts to retard the speed of rotation of the gyroscope as the angular velocity of the aeroplane increases. This may be found desirable due to the fact that the aeroplane in making abrupt turns to the right or left, causes a tendency on the part of the gyroscope to climb or act opposite to the action of the weighted member. Therefore, the angular velocity of the gyroscope may be decreased to a point where it more nearly neutralizes the centrifugal force tending to throw the overweight part of globe A outwardly.

*Fig. 8*

In Fig. 8 I have shown a modified form of my invention illustrating another method of shifting the transverse balance of the gyroscope for the purpose of decreasing the gyroscopic effect when the aeroplane turns to the right or to the left. This is for the same purpose as the brake mechanism shown in Fig. 5 except that in Fig. 8 intsead of slowing down the gyroscope to neutralize the centrifugal force I shift the balance, moving the fly wheel 30, 31 to the right or left as the case may be. In order to accomplish this I provide a pendulum 63 pivoted in a slot in the standard 25 at 64 and connected at 65 to a slidable shifting device 66 which carries rollers engaging the fly wheels 30, 31. Thus assuming the aeroplane turns toward the right, the pendulum 63 will swing toward the left thereby shifting the fly wheels 30, 31 toward the right so as to decrease the gyroscopic effect. It will be noted that the fly wheels are adjustable upon the motor shaft and may be moved along the shaft to vary the gyroscopic effect.

Another modification shown in Fig. 8 is the use of an unbalanced or over-weighted ring 18' which, due to its construction, will assist in maintaining this ring 18' in its proper position.

*Figs. 9 and 10*

In Figs 9 and 10 I have shown a modified form of compass adapted to be carried by the indicator globe A either in conjunction with the angle indicator or without it. This compass includes a flattened globe or shell member A' having a transparent top 28' through which the compass needle 38' may be observed. This needle 38' is mounted upon a suitable sleeve 39' supported upon the tip of the stationary shaft 67, the sleeve 39' also rotating within the jewel roller bearing 68 having a construction similar to that shown in Fig. 2. The sleeve 39' carries a degree indicator ring 69 which may be observed through the transparently closed opening 70. It will thus be apparent that by providing the compass construction illustrated and using it in connection with the gyroscopic stabilizer, I have a compass which remains practically level at all times regardless of the inclination of its support. In this form of device the general direction is indicated by the needle while the degrees are read on the disc of large diameter.

*Fig. 11*

In Fig. 11 I have shown a modified form of ring construction wherein instead of using a gimbal ring of the same width, I provide a ring 18² narrowed down at 18³ so that I not only reduce the weight of the device, which, of course, at times is important, but also remove parts of the device which might otherwise obscure the indicating system and prevent a ready observation of the graduations at all times.

I claim:

1. A device of the character described, comprising a support, adapted for mounting upon a moving body, and means carried by said support for indicating the angle of inclination of said moving body relative to a horizontal plane both in the direction of travel of said body and transversely of its direction of travel comprising a spherical framework, means universally mounting said framework in said support, cooperating indicating devices on said support and framework, a gyroscopic element mounted for rotation about a horizontal axis in said framework, the center of gravity of said framework and element being below the horizontal axis of support of said framework and means for rotating said element so that the upper side thereof moves in the general direction of movement of said moving body.

2. A device of the character described for indicating the inclination of an aircraft to the horizontal both in the direction of its travel and transversely thereto comprising a support adapted to be secured to said craft, a framework, means universally mounting said framework on said support whereby it may swing relative to said support about an axis parallel to the direction of travel of said craft and about a transverse axis extending at right angles to the direction of travel of said craft, said framework having its center of gravity below the supporting axis thereof, a single gyroscopic element mounted for rotation in said framework about a horizontal axis extending transversely to the direction of travel of said craft, means for rotating said element so that the upper side thereof moves in the direction of travel of said craft, and means for indicating the inclination of said support to said framework.

In witness whereof, I hereunto subscribe my name this 22nd day of October, A. D., 1918.

HELGE A. BORRESEN.